US011983933B1

(12) United States Patent
Pronovost

(10) Patent No.: US 11,983,933 B1
(45) Date of Patent: May 14, 2024

(54) BOUNDARY AWARE TOP-DOWN TRAJECTORY PREDICTION

(71) Applicant: Zoox, Inc., Foster City, CA (US)

(72) Inventor: Ethan Miller Pronovost, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 496 days.

(21) Appl. No.: 17/232,534

(22) Filed: Apr. 16, 2021

(51) Int. Cl.
*G06N 20/00* (2019.01)
*G06N 5/04* (2023.01)
*G06T 7/20* (2017.01)
*G06V 20/58* (2022.01)

(52) U.S. Cl.
CPC .............. *G06V 20/58* (2022.01); *G06N 5/04* (2013.01); *G06N 20/00* (2019.01); *G06T 7/20* (2013.01); *G06T 2207/20081* (2013.01); *G06T 2207/30241* (2013.01); *G06T 2207/30261* (2013.01)

(58) Field of Classification Search
CPC ...................................................... G06V 20/58
See application file for complete search history.

(56) References Cited

U.S. PATENT DOCUMENTS

| 2019/0332875 | A1* | 10/2019 | Vallespi-Gonzalez ....................... G06V 20/584 |
| 2022/0126864 | A1* | 4/2022 | Moustafa ............ B60W 30/182 |
| 2022/0153310 | A1* | 5/2022 | Yang ..................... G05D 1/0221 |
| 2022/0161811 | A1* | 5/2022 | Lu ...................... B60W 60/0053 |
| 2022/0161824 | A1* | 5/2022 | Refaat ................... G01S 13/581 |

* cited by examiner

*Primary Examiner* — Oneal R Mistry
(74) *Attorney, Agent, or Firm* — Lee & Hayes, P.C.

(57) ABSTRACT

Techniques for determining a classification score indicative of an object exiting an environment are discussed herein. Techniques may include analyzing sensor data associated with an area of an environment from a perspective, such as a top-down perspective. From this perspective, a machine-learned (ML) model may utilize techniques to determine output data including a classification score indicative of the object exiting the area and/or being occluded from a point of view of a vehicle within a threshold period of time. The classification score may be leveraged to determine whether a first prediction component or a second, less computationally expensive, prediction component may be employed to determine a predicted trajectory of the object.

20 Claims, 5 Drawing Sheets

BOUNDARY AWARE TOP-DOWN TRAJECTORY PREDICTION

BACKGROUND

Autonomous vehicles may use sensors to capture data representing objects in an environment. Techniques can be used to determine classifications of such objects. Current techniques often involve processing substantial environmental data, which may present challenges in resource-constrained environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
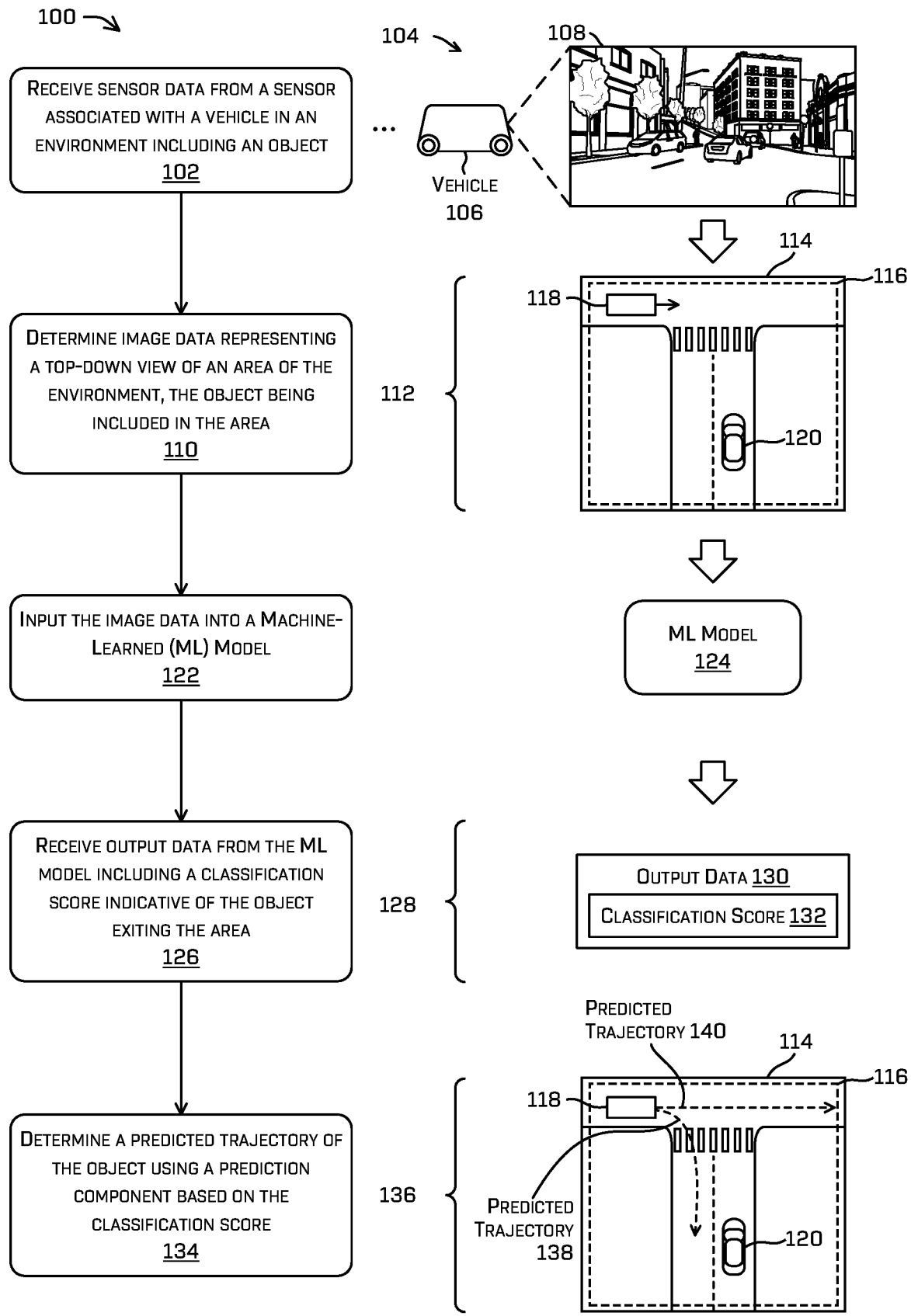
FIG. 1 is a pictorial flow diagram of an example process of receiving sensor data associated with a vehicle in an environment including an object, inputting image data representing a top-down view of an area of the environment into a machine-learned (ML) model, receiving output data including a classification score indicative of the object exiting the area, and determining a predicted trajectory of the object using a first prediction component or a second prediction component based on the classification score.

Techniques for processing sensor data to determine prediction classifications associated with movement of an object in an environment are discussed herein. For example, techniques may include determining, based on the sensor data, environment data representing an environment. For example, such environment data may be represented as image data, which may represent a top-down view of the environment. The sensor data may include data associated with an environment where, in some examples, one or more object(s) (e.g., pedestrians, vehicles, bicyclists, etc.) may reside. The sensor data (or data based on sensor data) may comprise feature data representing spatial attributes (e.g., map information, occupancy layers, etc.) associated with the object and/or non-spatial attributes (e.g., velocity, acceleration, classification score(s), etc.) associated with the object. Different prediction components may be employed for determining a predicted trajectory of an object based on the information derived from the sensor data.

The techniques described herein may include, but are not limited to, receiving sensor data associated with a vehicle in an area of environment including an object, viewing the sensor data (or data based on sensor data) as image data from a "top-down view," inputting the image data into a machine-learned (ML) model, receiving output data from the ML model indicating various classifications associated with the object and/or the area, such classifications may include a classification score indicative of the object exiting the area within a threshold period of time, determining whether the classification score satisfies a threshold score, and determining, based on the classification score, a predicted trajectory for the object using one of a first prediction component or a second predication component.

In some examples, the techniques discussed herein may be implemented in the context of a vehicle, such as an autonomous vehicle. The autonomous vehicle may capture sensor data as the vehicle traverses an environment and may determine image data. In some examples, a variety of sensor data may be associated with the image data. For example, in some examples, the image data may represent lidar data, radar data, time-of-flight data, or any other depth data. In some examples, the image data may be configured as multi-dimensional image data comprising layers associated with multiple classes of semantic information, although in some examples, data associated with certain classifications can be omitted from the image data.

As noted above, techniques may include performing operations based on data associated with an environment, an object included in the environment, image data (e.g., multi-channel image data), scene data, vectorized data, and the like. In some examples, the image data may represent a top-down view of the environment. Additionally, or alternatively, scene data may represent a scene of the environment. In some examples, the image data and/or scene data may represent an object in an area of the environment. The area may be centered on an autonomous vehicle, for example, and may be associated with a sensor range or a limit based on computation capabilities. Additionally, or alternatively, the area may be bounded, such that, a portion of scene data and/or image data corresponding to the area may be utilized to determine a trajectory for a vehicle traversing the environment. Additionally, or alternatively, the operations may further include determining one or more classification probabilities of an object based on the output data.

In some examples, a trajectory for an object confined to the area can be more accurately modeled via a machine learned or other model as a more complete history of the object or similar objects may be known. If an object leaves the area, full trajectory information may be incomplete. This may mean that a future trajectory of an object near a boundary of the area may be modeled with less certainty because information regarding the object may be incomplete or data from prior objects used to train a machine-learned model, for example, may be incomplete. The techniques disclosed herein may be used to account for this uncertainty by, for example, assigning an uncertainty score to an object by detecting its proximity to a boundary, apply a different model to estimate the object's future trajectory, or other.

While predicting a trajectory for an object in an area of an environment, a prediction component may predict future locations of the object for a threshold period of time, and then generate a trajectory from a starting point to the predicted future location. In some examples, the prediction component may predict future locations of each object included in an area of an environment. In some examples, predictions may be made for a discrete area around an autonomous vehicle. In some examples, the size of the area may be limited by an available amount of compute, a range of sensors, occlusions in an environment, or some other factors.

In examples, an object in an area of an environment may have a predicted future location that remains within the area of the environment. That is, a trajectory planning system may determine that an object is predicted to remain in the area within a threshold period of time. In such an example, a primary prediction component may be configured to determine a trajectory of the object from the object to the predicted future location that remains within the area of the environment using one or more machine-learned and/or algorithmic models. Additionally, or alternatively, an object in the area of the environment may have a predicted future location that is sufficiently close to, or outside of the area. That is, a trajectory planning system may determine that an object is predicted to exit the area within a threshold period of time. Additionally, or alternatively, an object may have a predicted future location that is occluded from a point of view of a sensor associated with the vehicle and/or a point of view of the vehicle. That is, a trajectory planning system may determine that an object is predicted to be occluded from a point of view associated with the vehicle within the threshold period of time.

In such an example where the object has a predicted future location that is sufficiently close to, or outside of the area, and/or occluded from a point of view of a sensor associated with the vehicle, problems may arise in attempting to employ the primary prediction component to determine a trajectory of the object from the object to the predicted future location that is sufficiently close to, or outside of the area, and/or occluded from a point of view of a sensor associated with the vehicle. As such, a secondary prediction component may be useful in handling scenarios where an object has a predicted future location that is sufficiently close to, or outside of the area, and/or occluded from a point of view of a sensor associated with the vehicle. In some examples, the secondary prediction component may be configured to determine a trajectory of the object without using scene context and utilizing a simplified and/or less computationally heavy model. For example, a secondary component may be configured to generate a trajectory based on a direction of an object at a given time and a velocity of the object at the given time (e.g., a kinematic-based model).

In examples, a trajectory planning system may determine a classification score indicative of whether the object will exit the area and/or be occluded from a point of view associated with the vehicle within a threshold period of time. For example, top-down image data representing a top-down view of an area of an environment may be input into an ML model, and the ML model may determine output data, including a classification score indicative of whether the object will exit the area and/or be occluded from a point of view associated with the vehicle within a threshold period of time (e.g., 1 second, 3 seconds, 6 seconds, and the like). The system may then utilize this classification score to determine a suitable a prediction component for determining a predicted trajectory of the object. That is, a primary prediction component may be employed when a classification score indicates that an object is to remain in the area within the threshold period of time, and a secondary prediction component may be employed when the classification score indicates that an object is to exit the area and/or become occluded within the threshold period of time.

In some examples, a classification score may be configured as a binary classification score, such that, the binary classification score may be represented by the integers 0 and 1 (e.g., 0 representing that the object is predicted to exit the area and 1 representing that the object is predicted to remain in the area). Additionally, or alternatively, the classification score may be represented by a float ranging from the values 0 to 1, such that, a value sufficiently close to 0 may represent that the object is predicted to exit the area and a value sufficiently close to 1 may represent that the object is predicted to remain in the area. Additionally, or alternatively, the closer a float value is to 0 or 1 may correspond to a confidence level of the prediction as to whether the object will exit the area within the threshold amount of time. Various ranges of binary and non-binary values representing a likelihood that an object may leave an area or otherwise approach a barrier are contemplated and the above examples are non-limiting.

Additionally, or alternatively, a confidence score may be included in the output data as well. For example, a confidence score may represent a standalone value indicating a level of confidence associated with a corresponding classification score. In some examples, the confidence score may be generated, and/or updated, based on various factors, such as, for example a position of an object within an area, a position of an object relative to a boundary of the area, contextual information associated with the object, contextual information associated with the environment, contextual information associated with the vehicle, and/or a period of time, amongst other things.

As previously mentioned, when determining a predicted trajectory of an object predicted to remain in an area of an environment (e.g., within a threshold distance to a vehicle capturing the sensor data), a primary prediction component may be configured to utilize contextual information associated with the environment (e.g., lane markings, crosswalks, locations of traffic lights, building locations, etc.) and contextual information associated with the object, such as, for example, a velocity of an object in an environment, an acceleration of an object in an environment, a current state of an object in an environment, an object behavior class (e.g., aggressive, normal, etc.), a binary classification score (e.g., indicating whether or not an object will exit an area in a threshold amount of time), and the like. Additionally, or alternatively, the primary prediction component may determine the predicted trajectory of an object by determining a predicted destination of the object within the area, and then determining the predicted trajectory by interpolating one or more points between the object and the predicted destination within the area. However, utilizing the primary prediction component to determine a predicted trajectory of an object by first determining a predicted destination of the object within the area may prove difficult for objects predicted to exit the area within the threshold period of time, and as such, a secondary prediction component may be contemplated. Additionally, or alternatively, a secondary prediction component may be employed to determine a predicted trajectory of an object predicted to exit the area of the environment (e.g., an object that is not within a threshold distance to a vehicle capturing the sensor data), and may utilize only certain contextual information associated with the object.

Such selection between a primary prediction component and a secondary prediction component may result in performance improvements associated with the system. For example, in scenarios where an object is predicted to exit an area (e.g., an area surrounding a vehicle collecting sensor data and/or a simulated vehicle) and/or become occluded from a point of view of the vehicle within a threshold period of time, the system may employ the secondary prediction component (e.g., a kinematics-based model that utilizes contextual information associated with an object and possibly less than all of the contextual information associated with the environment) to determine a predicted trajectory. As a result, determining a predicted trajectory of an object using the secondary model may require less data than the primary model, and as a result, determine a less complex predicted trajectory of an object (e.g., a straight trajectory having a distance based on a velocity of the object). Additionally, or alternatively, in scenarios where the object is predicted to remain in the area within the threshold period of time, the system may employ the primary prediction component (e.g., a more computationally-heavy model that utilizes contextual information associated with an object and contextual information associated with the environment) to determine a predicted trajectory. As a result, determining a predicted trajectory of the object using the primary model may require more data than the secondary model, and as a result, determine a more complex predicted trajectory of an object (e.g., a trajectory having one or more turns having a distance based on a velocity of the object).

The techniques discussed herein may improve a functioning of a computing device, such as a computing device of an autonomous vehicle, in a number of ways. For example, using a binary classification score indicative of whether an object will exit an area within a threshold amount of time, a primary prediction component or a secondary prediction component may be selected to determine a predicted trajectory of an object. A secondary prediction component may determine a predicted trajectory of an object using less data than a primary prediction component. Utilizing such a secondary prediction component may significantly reduce an amount of processing power and/or memory utilized by the system to determine the predicted trajectory when compared to utilizing a primary prediction component. The techniques described herein may also reduce latency for top-down predictions. As may be understood, reducing latency of top-down predictions may improve safety outcomes, particularly in the context of vehicles and autonomous vehicles. Thus, the techniques described herein may improve a functioning of a computing device as well as improve safety outcomes.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in a manufacturing assembly line context, in an aerial surveying context, or in a nautical context. Additionally, the techniques described herein may be used with real data (e.g., captured using sensor(s)), simulated data (e.g., generated by a simulator), or any combination of the two.

FIG. 1 is a pictorial flow diagram of an example process 100 of receiving sensor data associated with a vehicle in an environment including an object, inputting image data representing a top-down view of an area of the environment into a machine-learned (ML) model, receiving output data including a classification score indicative of the object exiting the area, and determining a predicted trajectory of the object using a first prediction component or a second prediction component based on the classification score.

At operation 102, the process may include receiving sensor data from a sensor operating in connection with a perception system of a vehicle (e.g., autonomous vehicle), in an area of an environment. In some examples, the area of the environment may include an object. Although discussed in the context of sensor data, the operation 102 can include receiving any three-dimensional data or data comprising a depth component. The semantic information can include, for example, one or more semantic classification(s), label(s), or segmentation information. In some instances, the operation 102 can include receiving a plurality of sensor datasets from a plurality of sensors operating in connection with the perception system. In some instances, the operation 102 can include combining or fusing data from two or more sensors (and/or over a period of time) into a single lidar dataset (also referred to as a "meta spin"). In some instances, the operation 102 can include extracting a portion of the sensor data for processing, such as over a period of time. In some instances, the operation 102 can include receiving radar data (or other sensor data) and associating the radar data with the sensor data to generate a more detailed representation of an environment.

As noted above, the sensor data (e.g., sensor dataset(s)) can be associated with semantic information. An example of such techniques for determining and associating the sensor data with the semantic information are discussed in, for example, in U.S. patent application Ser. No. 15/820,245 titled "Sensor Data Segmentation" and filed Nov. 21, 2017, which is incorporated by reference herein in its entirety for all purposes.

The semantic information may be associated with static and/or dynamic objects in the environment for classification and/or trajectory planning. Portions of the environment corresponding to a ground, static objects, and/or dynamic objects can be identified and labeled with such semantic information. In some examples, data can be segmented based at least in part on the semantic information. In some instances, a list of dynamic objects can be provided to a tracking system to track and/or predict a trajectory of each dynamic object over time. In some instances, a list of static objects and/or an identification of the ground can be provided to a planner system to generate a trajectory for the vehicle that traverses a drivable surface and avoids or otherwise accounts for the static objects identified herein.

An example 104 illustrates a vehicle 106 capturing sensor data 108 of an environment. In some examples, the sensor data 108 may comprise lidar data, radar data, sonar data, time-of-flight data, or other depth data. For example, the operation 102 may include capturing image data and generating depth data based on the captured image data.

At operation 110, the process may include determining image data 114 (e.g., a two-dimensional input grid) representing a top-down view of the area 116 of the environment. In some examples, the image data 114 may be determined based on the sensor data. Additionally, or alternatively, the image data 114 may be configured as multi-channel image data. Additionally, or alternatively, the process may include determining scene data representing a view of the area 116 of the environment. In some examples, the scene data may be determined based on the sensor data. In any example, the process may utilize any one of image data and/or scene data for any of the operations described herein.

An example of image data 114 is illustrated in an example 112. For example, the example 112 comprises the image data 114 representing the area of the environment 116, a bounding box, location, extent (e.g., length and width), and/or any other indication of the presence of an object 118 in the environment, and/or a representation of the vehicle 120.

The image data may include a plurality of regions. Each of the regions may be determined as the region of the two-dimensional representation and may be associated with a region of the environment. For example, a region may be associated with a region of an environment, based on three-dimensional information associated with the environment being converted to two-dimensional information associated with the region.

Each of the regions may include feature data. By way of example and without limitation, the feature data can include (for sensor data associated with a column) a plurality of spatial features and non-spatial features. In some examples, the spatial features may include, but are not limited to, map information of an environment (e.g., lane markings, crosswalks, locations of traffic lights, building locations, etc.), a bounding box of an object in an environment, a size of an object in an environment, and the like. Additionally, or alternatively, the non-spatial features may include, but are not limited to, a velocity of an object in an environment, an acceleration of an object in an environment, a lighting state associated with lights of an object in an environment, an object behavior class (e.g., aggressive, normal, etc.), a binary classification of an object (e.g., a score indicative of whether or not an object will remain in the area 116 within a threshold period of time) and the like. In some examples, one or more features associated with the sensor data may be encoded or otherwise stored as the image data 114 and/or a layer of a multi-channel input image. Thus, the data may be efficiently represented for input to a machine learned model.

As can be understood, the operation 110 can include generating or determining the multi-channel image(s), as discussed herein. Examples of generating or determining multi-channel image(s) are discussed in connection with U.S. patent application Ser. No. 16/151,607, entitled "Trajectory Prediction on Top-Down Scenes," and filed Oct. 4, 2018. application Ser. No. 16/151,607 is herein incorporated by reference, in its entirety for all purposes.

The operation 122 may include inputting the image data 114 (e.g., top-down or another view) into a machine-learned (ML) model 124. The ML model 124 may process the image data 114 and determine output data corresponding to the image data 114. In some examples, the operation 122 may include inputting the image data into any kind of algorithmic model, such as, for example, a kinematic model and/or the like.

The operation 126 may include receiving output data from the ML model including a classification score indicative of the object exiting the area within a threshold period of time.

An example of the output data is illustrated in example 128. In some examples, the example 128 may comprise the output data 130. In some examples, the output data 130 may comprise the classification score 132, amongst other data included in the output data 132. In some examples, the classification score 132 may indicate whether the object 118 will exit the area 116 and/or be occluded from a point of view associated with the vehicle 120 within a threshold period of time (e.g., 1 second, 3 seconds, 6 seconds, and the like). The system may then utilize this classification score 132 to determine a suitable prediction component for determining a predicted trajectory of the object 118.

In some examples, the classification score 132 may be configured as a binary classification score, such that, the classification score 132 may be represented by the integers 0 and 1 (e.g., 0 representing that the object 118 is predicted to exit the area 116 and 1 representing that the object 118 is predicted to remain in the area 116). Additionally, or alternatively, the classification score 132 may be represented by a float ranging from the values 0 to 1, such that, a value sufficiently close to 0 (e.g., 0.2) may represent that the object 118 is predicted to exit the area 116 and/or become occluded from a point of view of the vehicle 120, and a value sufficiently close to 1 (e.g., 0.7) may represent that the object 118 is predicted to remain in the area 116 and/or remain in view from the point of view of the vehicle 120. Additionally, or alternatively, the closer a value is to 0 or 1 may correspond to a confidence level of the prediction as to whether the object 118 will exit the area 116 and/or become occluded from a point of view of the vehicle 120 within the threshold amount of time.

The operation 134 may include determining a predicted trajectory of the object 118 using one of a first prediction component or a second prediction component based on the classification score 132. That is, a primary prediction component may be employed when a classification score 132 indicates that an object 118 is to remain in the area 116 within the threshold period of time, and a secondary prediction component may be employed when the classification score 132 indicates that an object 118 is to exit the area 116 and/or become occluded from a point of view of the vehicle 120 within the threshold period of time.

An example representing predicted trajectories determined by a first prediction component and a second prediction component is illustrated in example 136. In some examples, the classification score 132 may indicate that the object 118 is predicted to remain in the area 116 within the threshold period of time. Additionally, or alternatively, the classification score 132 may indicate that the object 118 is predicted to exit the area 116 within the threshold period of time.

In such examples where the classification score 132 indicates that the object 118 is predicted to remain in the area 116 within the threshold period of time, a first prediction component (e.g., a primary prediction component) may be employed to determine a predicted trajectory 138 of the object 118. The first prediction component may be configured to utilize contextual information associated with the environment (e.g., lane markings, crosswalks, locations of traffic lights, building locations, etc.) and contextual information associated with the object 118, such as, for example, a velocity of an object 118 in an environment, an acceleration of an object 118 in an environment, a current state of an object 118 in an environment, an object behavior class (e.g., aggressive, normal, etc.), a binary classification score (e.g., indicating whether or not an object 118 will exit an area in a threshold amount of time), and the like.

As such, the first prediction component (e.g., a more computationally-heavy model that utilizes contextual information associated with an object and contextual information associated with the environment) may utilize more data than the second prediction component, and as a result, determine a more complex predicted trajectory 138 of an object 118

(e.g., a trajectory having one or more turns having a distance based on a velocity of the object 118). Additionally, or alternatively, the first prediction component may determine the predicted trajectory 138 of an object 118 by determining a predicted destination of the object 118 within the area 116, and then determining the predicted trajectory 138 by interpolating one or more points between the object 118 and the predicted destination within the area 116. As such, utilizing the first prediction component to determine a predicted trajectory of an object 118 by first determining a predicted destination of the object 118 within the area 116 may prove difficult for objects 118 predicted to exit the area 116 within the threshold period of time. In some examples a classification score (such as classification score 132 or in addition to classification score 132) can be assigned indicating a probability that an object will leave and then reenter an area for future retention of tracking/classification information.

Additionally, or alternatively, in such examples where the classification score indicates that the object 118 is predicted to exit the area 116 and/or become occluded from a point of view of the vehicle 120 within the threshold period of time, a second prediction component (e.g., a secondary prediction component) may be employed to determine a predicted trajectory 140 of the object 118. The second prediction component may be configured to utilize only contextual information associated with the object 118 and not contextual information associated with the environment.

As such, the second prediction component (e.g., a kinematics-based model that utilizes only contextual information associated with an object and not contextual information associated with the environment) may utilize less data than the first prediction component, and as a result, determine a less complex predicted trajectory 140 of the object 118 (e.g., a straight trajectory having a distance based on a velocity of the object).

Additionally, or alternatively, at operation 134, the process may include controlling a vehicle 106 and/or 120 based at least in part on processing the predicted trajectory 138 and/or the predicted trajectory 140 of object 118. In some examples, the operation 134 may be performed by the vehicle 106 and/or 120. In some examples, the operation 134 may include generating a route, trajectory, and/or control signals for one or more systems of the vehicle 106 and/or 120 to navigate the vehicle 106 and/or 120 within the environment.

Figure 2:
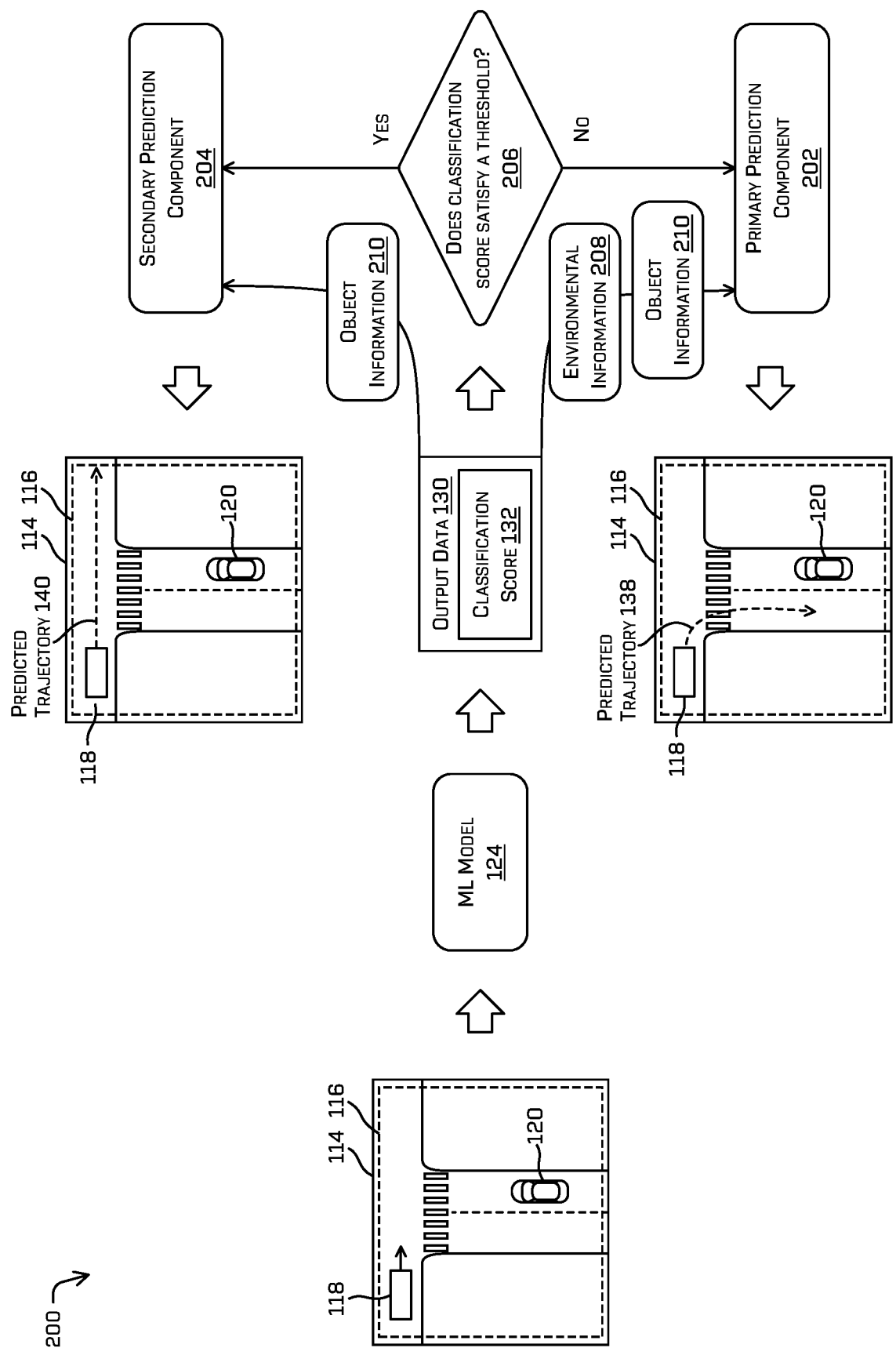
FIG. 2 depicts an example architecture and flow of a system for processing the image data with an ML model to determine a classification score and determining whether to utilize a first prediction component or a second prediction component to determine a predicted trajectory of an object.

FIG. 2 illustrates an example architecture and flow 200 of a system for processing the image data 114 with an ML model 124 to determine a classification score 132 and determining whether to utilize a first prediction component 202 or a second prediction component 204 to determine a predicted trajectory 138, 140 of an object 118.

As illustrated, image data 114, depicting at least an area 116 of an environment including an object 118 and/or a vehicle 120, may be input into a ML model. The ML model may generate output data 130 corresponding to the image data 114. In some examples, the output data 130 may include a classification score 132 associated with the object. In some examples, the classification score 132 may be indicative of whether or not the object 118 will exit the area 116 within a threshold period of time.

In some examples, a classification score 132 may be configured as a binary classification score, such that, the binary classification score may be represented by the integers 0 and 1 (e.g., 0 representing that the object 118 is predicted to exit the area 116 and 1 representing that the object 118 is predicted to remain in the area 116). Additionally, or alternatively, the classification score 132 may be represented by a float ranging from the values 0 to 1, such that, a value sufficiently close to 0 may represent that the object 118 is predicted to exit the area 116 and a value sufficiently close to 1 may represent that the object 118 is predicted to remain in the area 116. Additionally, or alternatively, the closer a float value is to 0 or 1 may correspond to a confidence level of the prediction as to whether the object 118 will exit the area 116 within the threshold amount of time.

At 206, the system may make a determination as to whether the classification score 132 satisfies a threshold score. For example, a classification score 132 of 0.7 (or a classification score of 1 in a binary example) may satisfy a threshold score (e.g., a threshold score of 0.5), such that the classification score 132 exceeds the threshold score, and thus indicates that the object 118 is predicted to exit the area 116 within the threshold period of time. Additionally, or alternatively, a classification score 132 of 0.2 (or a classification score of 0 in a binary example) may satisfy a threshold score (e.g., a threshold score of 0.5), such that the classification score 132 does not exceed the threshold score, and thus indicates that the object 118 is predicated to remain in the area 116 within the threshold period of time.

In examples where the classification score 132 does not satisfy the threshold score (e.g., the classification score 132 indicates that the object 118 will remain in the area 116 within the threshold period of time), the system may pass data representing environmental information 208 and/or data representing object information 210 to a first prediction component 202. The first prediction component 202 may be configured to utilize data representing the environmental information 208 (e.g., lane markings, crosswalks, locations of traffic lights, building locations, etc.) and the data representing the object information 210 such as, for example, a velocity of an object 118 in an environment, an acceleration of an object 118 in an environment, a current state of an object 118 in an environment, an object behavior class (e.g., aggressive, normal, etc.), a classification score 132 (e.g., indicating whether or not an object 118 will exit an area in a threshold amount of time), and the like.

As such, the first prediction component 202 (e.g., a more computationally-heavy model that utilizes data representing environmental information 208 and data representing object information 210) may utilize more data than the second prediction component 204, and as a result, determine a more complex predicted trajectory 138 of an object 118 (e.g., a trajectory having one or more turns having a distance based on a velocity of the object 118).

Additionally, or alternatively, in examples where the classification score satisfies the threshold score (e.g., the classification score 132 indicates that the object will exit the area within the threshold period of time), the system may pass data representing only object information 210 to a second prediction component 204. The second prediction component 204 may be configured to utilize only data representing the object information 210 and not the data representing the environmental information 208.

As such, the second prediction component 204 (e.g., a kinematics-based model that utilizes only data representing object information 210 and not data representing environmental information 208) may utilize less data than the first prediction component 202, and as a result, determine a less complex predicted trajectory 140 of the object 118 (e.g., a straight trajectory having a distance based on a velocity of the object 118).

Figure 3A:
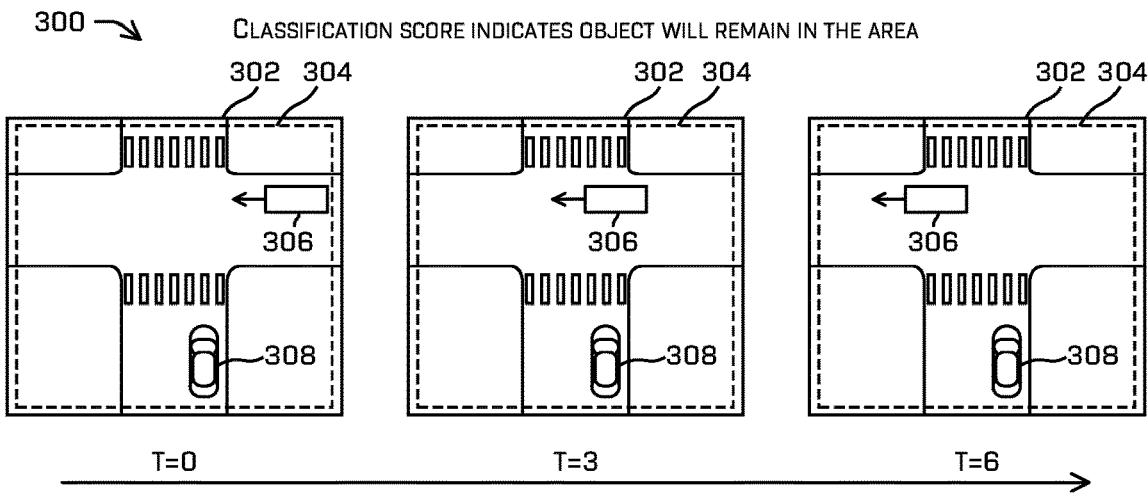
FIG. 3A depicts an example scenario in which the output data may include a classification score that indicates a corresponding object will remain in an area within a threshold period of time.

FIG. 3A illustrates an example scenario 300 in which the output data 130, determined based on input image data 302, may include a classification score 132 that indicates a corresponding object 306 will remain in an area 304 within a threshold period of time (t=0 through t=6, for example).

As illustrated, the scenario 300 includes input image data 302 at various time intervals (t=0, t=3, and t=6). The image data 302 may be input into a ML model, which may generate output data corresponding to the image data 302. As previously mentioned, the output data 130 may include a classification score 132. The classification score 132 may indicate whether an object 306 will exit an area 304 within a threshold period of time (e.g., t=0 through t=6).

At "t=0," the image data 302 includes the object 306 at a first predicted location within the threshold period of time. The first predicted location may be a starting location of the object 306 and/or may be predicted based on a speed, direction, and/or other attributes of the object 306 as indicated by the sensor data. In this example, the first predicted location may be located within the area 304.

At "t=3," the image data 302 includes the object 306 at a second predicted location within the threshold period of time. The second predicted location may be based on the first predicted location (represented at time t=0) and/or may be predicted based on a speed, direction, and/or other attributes of the object 306 as indicated by the sensor data. In this example, the second predicted location may be located within the area 304.

At "t=6," the image data 302 includes the object 306 at a third predicted location within the threshold period of time. The third predicted location may be based on the first predicted location (represented at time t=0), the second predicted location (represented at time t=3), and/or may be predicted based on a speed, direction, and/or other attributes of the object 306 as indicated by the sensor data. In this example, the third predicted location may be located within the area 304.

As indicated by the object 306 represented at t=6, in this scenario 300, the object 306 is predicted to remain in the area 304 within the threshold period of time, and as such, the ML model may generate output data 130 including a classification score 132 indicative of the object 306 remaining the area 304 within the threshold period of time. In this example, the system may utilize the first prediction component 202 (e.g., a primary predication component) to determine a predicted trajectory of the object 306.

Figure 3B:
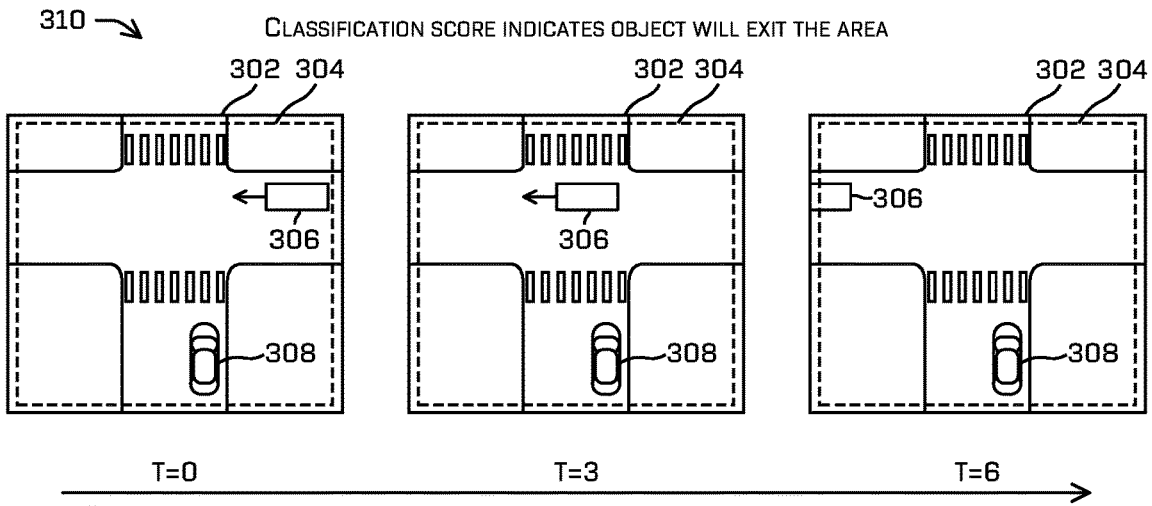
FIG. 3B depicts an example scenario in which the output data may include a classification score that indicates a corresponding object will exit the area within a threshold period of time.

FIG. 3B illustrates an example scenario 310 in which the output data 130, determined based on input image data 302, may include a classification score 132 that indicates a corresponding object 306 will exit the area 304 within a threshold period of time (t=0 through t=6, for example).

As illustrated, the scenario 310 includes input image data 302 at various time intervals (t=0, t=3, and t=6). The image data 302 may be input into a ML model, which may generate output data corresponding to the image data 302. As previously mentioned, the output data 130 may include a classification score 132. The classification score 132 may indicate whether an object 306 will exit an area 304 within a threshold period of time (e.g., t=0 through t=6).

At "t=0," the image data 302 includes the object 306 at a first predicted location within the threshold period of time. The first predicted location may be a starting location of the object 306 and/or may be predicted based on a speed, direction, and/or other attributes of the object 306 as indicated by the sensor data. In this example, the first predicted location may be located within the area 304.

At "t=3," the image data 302 includes the object 306 at a second predicted location within the threshold period of time. The second predicted location may be based on the first predicted location (represented at time t=0) and/or may be predicted based on a speed, direction, and/or other attributes of the object 306 as indicated by the sensor data. In this example, the second predicted location may be located within the area 304.

At "t=6," the image data 302 includes the object 306 at a third predicted location within the threshold period of time. The third predicted location may be based on the first predicted location (represented at time t=0), the second predicted location (represented at time t=3), and/or may be predicted based on a speed, direction, and/or other attributes of the object 306 as indicated by the sensor data. In this example, the third predicted location may be located at least partially beyond the area 304.

As indicated by the object 306 represented at t=6, in this scenario 310, the object 306 is predicted to at least partially move beyond the area 304 within the threshold period of time, and as such, the ML model may generate output data 130 including a classification score 132 indicative of the object 306 exiting the area 304 within the threshold period of time. In this example, the system may utilize the second prediction component 204 (e.g., a secondary prediction component) to determine a predicted trajectory of the object 306.

Figure 3C:
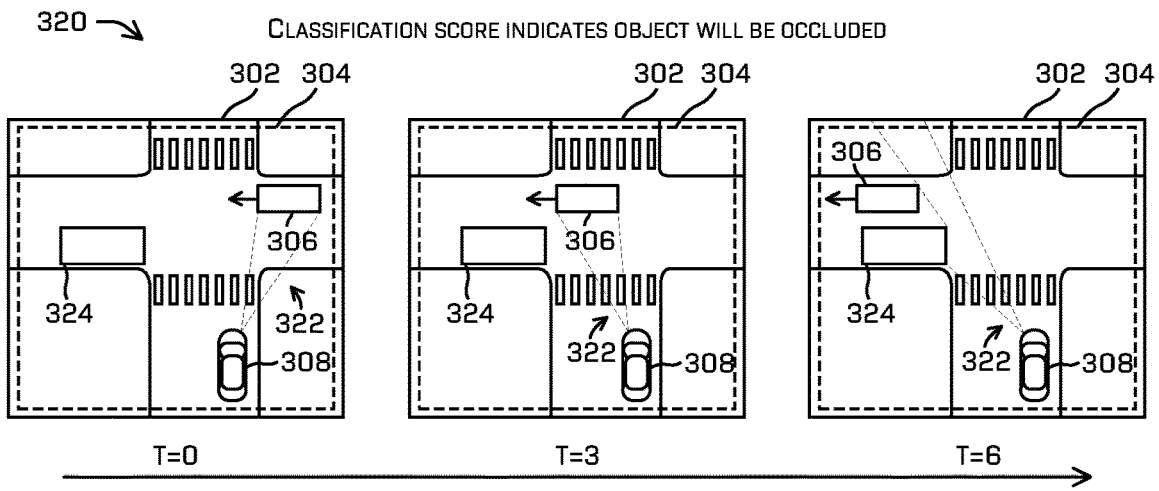
FIG. 3C depicts an example scenario in which the output data may include a classification score that indicates a corresponding object will be occluded by an additional object in the area within a threshold period of time.

FIG. 3C illustrates an example scenario 320 in which the output data 130, determined based on input image data 302, may include a classification score 132 that indicates a corresponding object 306 will be occluded from a point of view 322 of a vehicle 308 by an additional object 324 in the area 304 within a threshold period of time (t=0 through t=6, for example).

As illustrated, the scenario 320 includes input image data 302 at various time intervals (t=0, t=3, and t=6). The image data 302 may be input into a ML model, which may generate output data corresponding to the image data 302. As previously mentioned, the output data 130 may include a classification score 132. The classification score 132 may indicate whether an object 306 will be occluded from a point of view 322 of the vehicle 308 by an additional object 324 within a threshold period of time (e.g., t=0 through t=6).

At "t=0," the image data 302 includes the object 306 at a first predicted location within the threshold period of time. The first predicted location may be a starting location of the object 306 and/or may be predicted based on a speed, direction, and/or other attributes of the object 306 as indicated by the sensor data. In this example, the first predicted location may be located within a point of view 322 of the vehicle 308.

At "t=3," the image data 302 includes the object 306 at a second predicted location within the threshold period of time. The second predicted location may be based on the first predicted location (represented at time t=0) and/or may be predicted based on a speed, direction, and/or other attributes of the object 306 as indicated by the sensor data. In this example, the second predicted location may be located within a point of view 322 of the vehicle 308.

At "t=6," the image data 302 includes the object 306 at a third predicted location within the threshold period of time. The third predicted location may be based on the first predicted location (represented at time t=0), the second predicted location (represented at time t=3), and/or may be predicted based on a speed, direction, and/or other attributes of the object 306 as indicated by the sensor data. In this example, the third predicted location may be located outside of a point of view 322 of the vehicle 308, such that, the object 306 may be occluded from the point of view 322 of the vehicle 308 by an additional object 324.

As indicated by the object 306 represented by at t=6, in this scenario 320, the object 306 is predicted to be occluded from the point of view 322 of the vehicle 308 by an additional object 324 within the threshold period of time, and as such, the ML model may generate output data 130 including a classification score 132 indicative of the object 306 being occluded from the point of view 322 of the vehicle 308 within the threshold period of time (in this example, the object 306 remains in the area 304, but is occluded). In this example, the system may utilize the second prediction component 204 (e.g., a second prediction component) to determine a predicted trajectory of the object 306.

Figure 4:
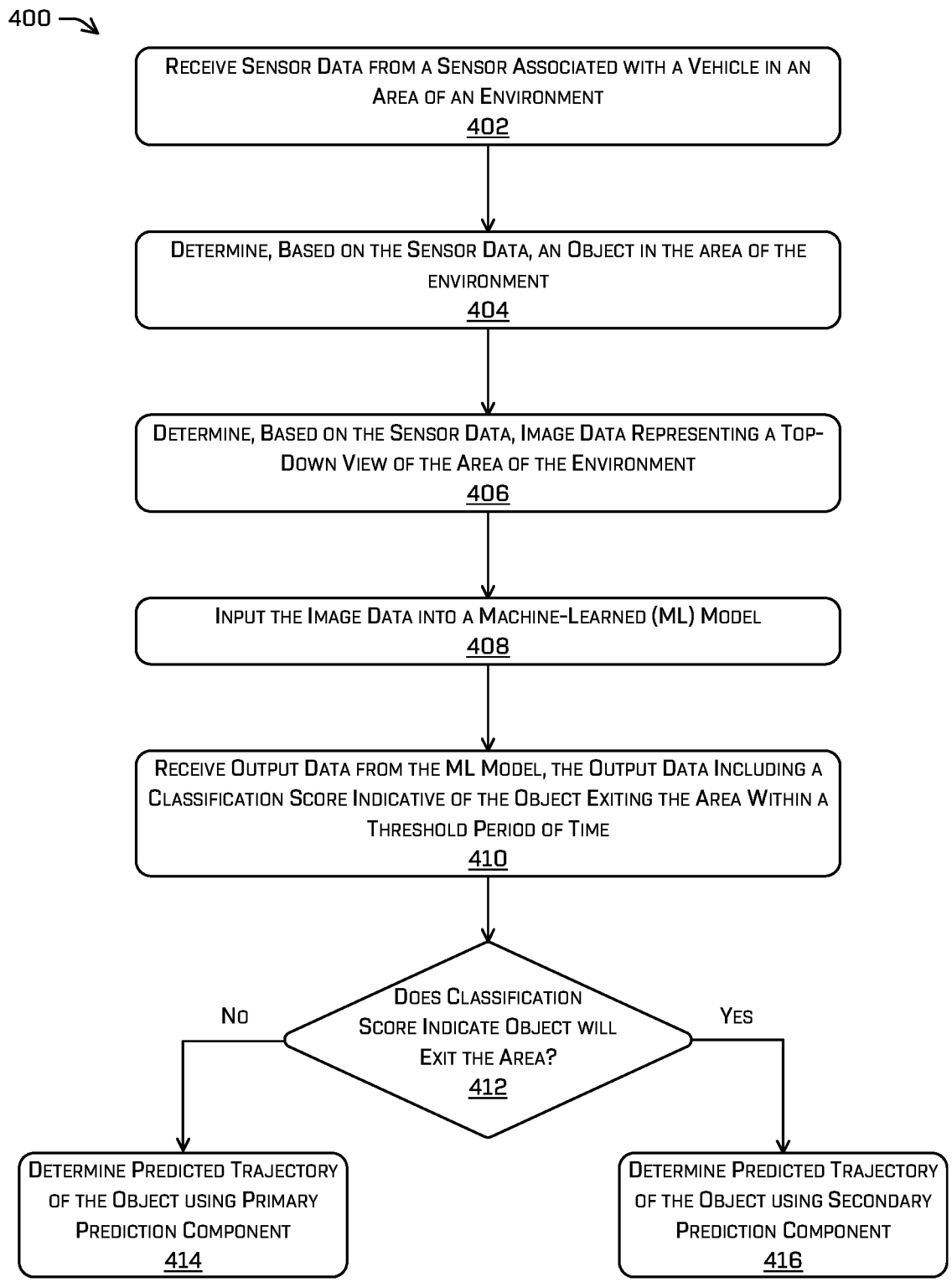
FIG. 4 is an example process for receiving sensor data associated with a vehicle in an environment including an object, inputting image data representing a top-down view of an area of the environment into a machine-learned (ML) model, receiving output data including a classification score indicative of the object exiting the area, and determining a predicted trajectory of the object using a first prediction component or a second prediction component based on the classification score.

FIGS. 1 and 4 illustrate example processes in accordance with examples of the disclosure. These processes are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes. For example, some or all of the process 400 may be performed by one or more components in FIG. 5, as described herein. For example, some or all of the process 400 may be performed by the classification component 524, the imaging component 526, the first prediction component 530, and/or the second prediction component 532.

FIG. 4 is an example process 400 for receiving sensor data associated with a vehicle in an environment including an object, inputting image data representing a top-down view of an area of the environment into a machine-learned (ML) model, receiving output data including a classification score indicative of the object exiting the area, and determining a predicted trajectory of the object using a first prediction component or a second prediction component based on the classification score.

The process 400 begins at operation 402 and includes receiving sensor data from a sensor associated with a vehicle in the environment. In some examples, the area of the environment may include an object. In some examples, the vehicle may be configured as the vehicle 106, 120 and/or may employ any of the techniques associated with the vehicle 106, 120 as described with respect to FIG. 1.

At operation 404, the process 400 may include determining and/or identifying an object in the area of the environment. In some examples, determining and/or identifying the object in the area of the environment may be based at least in part on the sensor data.

At operation 406, the process 400 may include determining image data representing a top down view of the environment. In some examples, the image data may represent a top-down view of the area of the environment. In some examples, the image data may be based at least in part on the sensor data. In some examples, the imaging component 526 as described with respect to FIG. 5 may be configured to generate the image data.

At operation 408, the process 400 may include inputting the image data into a machine-learned (ML) model. In some examples, the ML model may process the image data and determine output data. In some examples, the ML model may be configured as the ML model 124 and/or may employ and of the techniques associated with the ML model 124 as described with respect to FIGS. 1 and 2.

At operation 410, the process 400 may include receiving output data from the ML model. In some examples, the output data may include a classification score indicative of the object exiting the area within a threshold period of time. Additionally, or alternatively, the output data may include a classification score indicative of the object being occluded from a point of view of the vehicle within a threshold period of time. In some examples, the output data and/or the classification score may be configured as the output data 130 and/or the classification score 132 and may employ any of the techniques associated with the output data 130 and/or the classification score 132, respectively, as described with respect to FIGS. 1-3C.

At operation 412, the process 400 may include determining whether the classification score indicates that the object will exit the area within a threshold period of time. By way of example, the operation 412 may include determining that the classification score does not satisfy a threshold score (e.g., the classification score indicates that the object is predicted to remain in the area and/or remain in the point of view of the vehicle within the threshold period of time). Additionally, or alternatively, the operation 412 may include determining whether the classification score comprises a value that may indicate that the object will exit the area within a threshold period of time. The process may subsequently include the operation 414 to determine the predicted trajectory of the object using the first prediction component. In some examples, the first prediction component may be configured as the first prediction component 202 and/or may employ and of the techniques associated with the first prediction component 202 as described with respect to FIG. 2.

By way of another example, the operation 412 may include determining that the classification score indicates that the object will remain in the area within the threshold period of time. By way of example, the operation 412 may include determining that the classification score does satisfy a threshold score (e.g., the classification score indicates that the object is predicted to exit the area and/or become occluded from the point of view of the vehicle within the threshold period of time). The process may subsequently include the operation 416 to determine the predicted trajectory of the object using the second prediction component. In some examples, the second prediction component may be configured as the second prediction component 204 and/or may employ and of the techniques associated with the second prediction component 204 as described with respect to FIG. 2.

At operation 414, the process 400 may include determining a predicted trajectory of the object using a first prediction component. In some examples, the predicted trajectory of the object may redetermined using the classification score. The first prediction component may include functionality to utilize data representing the environmental information (e.g., lane markings, crosswalks, locations of traffic lights, building locations, etc.) and the data representing the object information such as, for example, a velocity of an object in an environment, an acceleration of an object in an environment, a current state of an object in an environment, an object behavior class (e.g., aggressive, normal, etc.), a classification score (e.g., indicating whether or not an object will exit an area in a threshold amount of time), and the like. Additionally, or alternatively, the first prediction component (e.g., a more computationally-heavy model that utilizes data representing environmental information and data representing object information) may utilize more data than the second prediction component, and as a result, determine a more complex predicted trajectory of an object (e.g., a trajectory having one or more turns having a distance based on a velocity of the object). Additionally, or alternatively, the first prediction component may determine the predicted trajectory of an object by determining a predicted destination of the object within the area, and then determining the predicted trajectory by interpolating one or more points between the object and the predicted destination within the area. However, utilizing the first prediction component to determine a predicted trajectory of an object by first determining a predicted destination of the object within the area may prove difficult for objects predicted to exit the area within the threshold period of time, and as such, a second prediction component may be contemplated.

At operation 416, the process 400 may include determining a predicted trajectory of the object using a second prediction component. In some examples, the predicted trajectory of the object may redetermined using the classification score. The second prediction component may include functionality to utilize only data representing the object information and not the data representing the environmental information. As such, the second prediction component (e.g., a kinematics-based model that utilizes only data representing object information and not data representing environmental information) may utilize less data than the first prediction component, and as a result, determine a less complex predicted trajectory of the object (e.g., a straight trajectory having a distance based on a velocity of the object).

Figure 5:
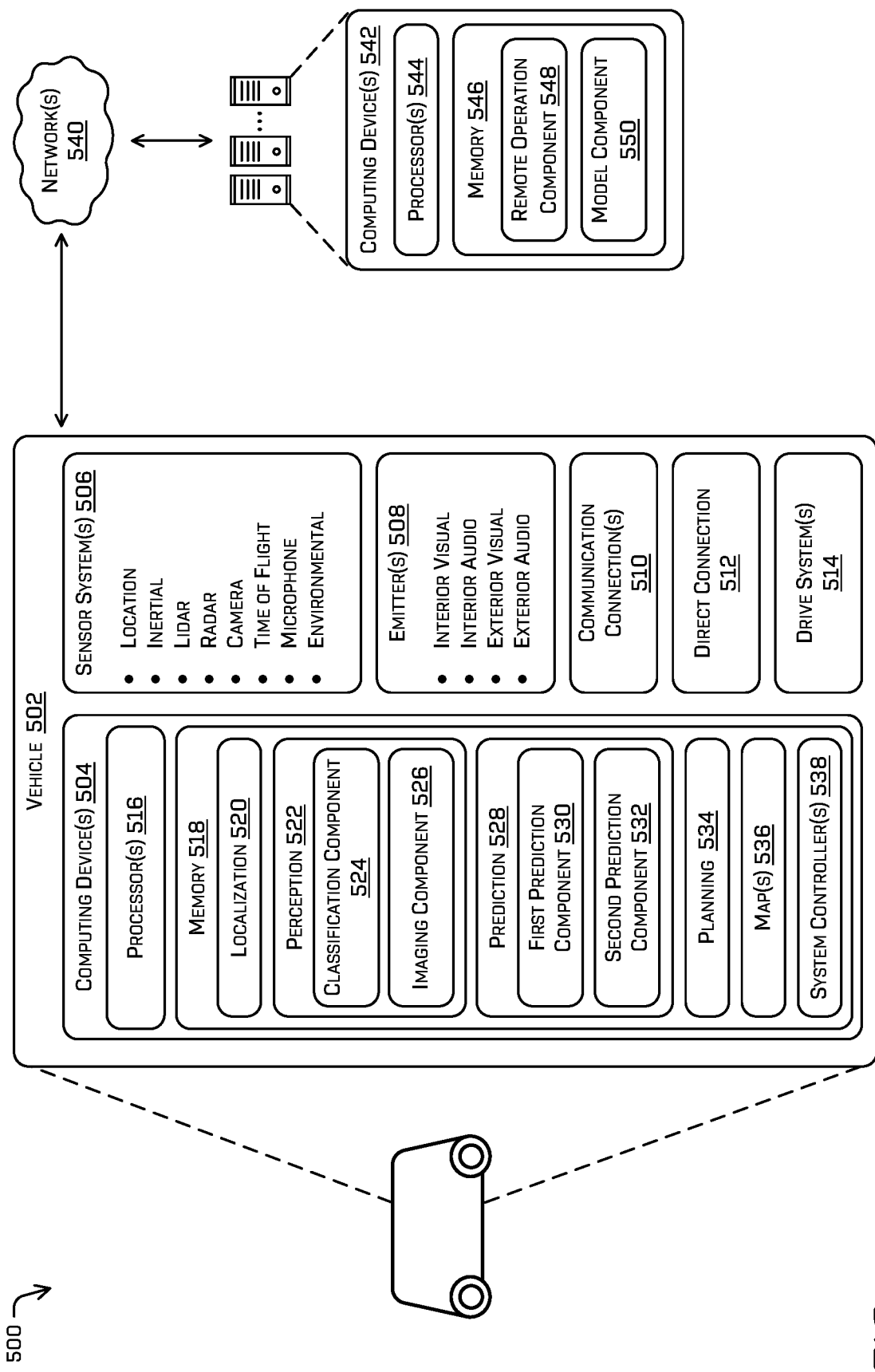
FIG. 5 is a block diagram of an example system for implementing the techniques described herein.

FIG. 5 is a block diagram of an example system 500 for implementing the techniques described herein. In at least one example, the system 500 may include a vehicle 502. In the illustrated example system 500, the vehicle 502 is an autonomous vehicle; however, the vehicle 502 may be any other type of vehicle.

The vehicle 502 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 may be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 may include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 may be configured to capture sensor data associated with an environment.

The one or more sensor system(s) 506 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 may include multiple instances of each of these or other types of sensors. For instance, the time-of-flight sensors may include individual time-of-flight sensors located at the corners, front, back, sides, and/or top of the vehicle 502. As another example, the camera sensors may include multiple cameras disposed at various locations about the exterior and/or interior of the vehicle 502. The one or more sensor system(s) 506 may provide input to the computing device 504.

The vehicle 502 may also include one or more emitter(s) 508 for emitting light and/or sound. The one or more emitter(s) 508 in this example include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 may also include one or more communication connection(s) 510 that enable communication between the vehicle 502 and one or more other local or remote computing device(s) (e.g., a remote teleoperation computing device) or remote services. For instance, the one or more communication connection(s) 510 may facilitate communication with other local computing device(s) on the vehicle 502 and/or the one or more drive system(s) 514. Also, the one or more communication connection(s) 510 may allow the vehicle 502 to communicate with other nearby computing device(s) (e.g., other nearby vehicles, traffic signals, etc.).

The one or more communications connection(s) 510 may include physical and/or logical interfaces for connecting the computing device 504 to another computing device or one or more external networks 540 (e.g., the Internet). For example, the one or more communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 may include one or more drive system(s) 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor system(s) 506 to detect conditions of the drive system(s) 514 and/or the surroundings of the vehicle

502. By way of example and not limitation, the sensor system(s) 506 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 514. In some cases, the sensor system(s) 506 on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive system controller which may receive and preprocess data from the sensor system(s) 506 and to control operation of the various vehicle systems. In some examples, the drive system controller may include one or more processor(s) and memory communicatively coupled with the one or more processor(s). The memory may store one or more components to perform various functionalities of the drive system(s) 514. Furthermore, the drive system(s) 514 also include one or more communication connection(s) that enable communication by the respective drive system with one or more other local or remote computing device(s).

The computing device 504 may include one or more processor(s) 516 and memory 518 communicatively coupled with the one or more processor(s) 516. In the illustrated example, the memory 518 of the computing device 504 stores a localization component 520, a perception component 522 comprising a classification component 524 and an imaging component 526, a prediction component 528 comprising a first prediction component 530 and a second prediction component 532, a planning component 534, a maps component 536, and one or more system controller(s) 538. Though depicted as residing in the memory 518 for illustrative purposes, it is contemplated that the localization component 520, the perception component 522, the classification component 524, the imaging component 526, the prediction component 528, the first prediction component 530, the second prediction component 532, the planning component 534, the maps component 536, and the one or more system controller(s) 538 may additionally, or alternatively, be accessible to the computing device 504 (e.g., stored in a different component of vehicle 502) and/or be accessible to the vehicle 502 (e.g., stored remotely).

In memory 518 of the computing device 504, the localization component 520 may include functionality to receive data from the sensor system(s) 506 to determine a position of the vehicle 502. For example, the localization component 520 may include and/or request/receive a three-dimensional map of an environment and may continuously determine a location of the autonomous vehicle within the map. In some examples, the localization component 520 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some examples, the localization component 520 may provide data to various components of the vehicle 502 to determine an initial position of an autonomous vehicle for generating a trajectory, as discussed herein.

The perception component 522 may include functionality to perform object detection, segmentation, and/or classification. In some examples, the perception component 522 may provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 522 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

As described above, the perception component 522 may use perception algorithms to determine a perception-based bounding box associated with an object in the environment based on sensor data. For example, the perception component 522 may receive image data and classify the image data to determine that an object is represented in the image data. Then, using detection algorithms, the perception component 522 may generate a two-dimensional bounding box and/or a perception-based three-dimensional bounding box associated with the object. The perception component 522 may further generate a three-dimensional bounding box associated with the object. As discussed above, the three-dimensional bounding box may provide additional information such as a location, orientation, pose, and/or size (e.g., length, width, height, etc.) associated with the object.

The perception component 522 may include functionality to store perception data generated by the perception component 522. In some examples, the perception component 522 may determine a track corresponding to an object that has been classified as an object type. For purposes of illustration only, the perception component 522, using sensor system(s) 506 may capture one or more images of an environment. The sensor system(s) 506 may capture images of an environment that includes an object, such as a pedestrian. The pedestrian may be at a first position at a time T and at a second position at time T+t (e.g., movement during a span of time t after time T). In other words, the pedestrian may move during this time span from the first position to the second position. Such movement may, for example, be logged as stored perception data associated with the object.

The stored perception data may, in some examples, include fused perception data captured by the vehicle. Fused perception data may include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data. The stored perception data may additionally or alternatively include track data (positions, orientations, sensor features, etc.) corresponding to motion of objects classified as dynamic objects through the environment. The track data may include multiple tracks of multiple different objects over time. This track data may be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The classification component 524 may include functionality to generate a classification score 132 indicative of whether an object will exit an area of an environment and/or be occluded from a point of view of a vehicle within a threshold period of time. For example, the classification component 524 may make various predictions associated with an object in an environment, such as, a prediction that the object will remain in an area within a threshold period of time, a prediction that the object will exit the area within a threshold period of time, a prediction that the object will remain in the point of view of the vehicle within the threshold period of time, and/or a prediction that the object will be occluded from the point of view of the vehicle within the threshold period of time. The classification component 132 may make any of these predictions in accordance with the examples provided above with respect to FIGS. 1-3C.

In some examples, the classification component 524 may be configured to determine a classification score 132 configured as a binary classification score, such that, the binary classification score may be represented by the integers 0 and 1 (e.g., 0 representing that the object is predicted to exit the area and 1 representing that the object is predicted to remain in the area). Additionally, or alternatively, the classification component 524 may be configured to determine the classification score 132 to be represented by a float ranging from the values 0 to 1, such that, a value sufficiently close to 0 may represent that the object is predicted to exit the area and a value sufficiently close to 1 may represent that the object is predicted to remain in the area. Additionally, or alternatively, the closer a float value is to 0 or 1 may correspond to a confidence level of the prediction as to whether the object will exit the area within the threshold amount of time.

The imaging component 526 may include functionality to determine a top-down representation (or a representation from any view) of an area of an environment. Additionally, or alternatively, the imaging component 526 may include functionality to generate the predictions utilized by the classification component 524 to determine the classification score 132 of an object. Additionally, or alternatively, the imaging component may be configured to determine the top-down representation including predictions for a threshold period of time (e.g., t=0 through t=6, as described with respect to FIGS. 3A-3C).

The prediction component 528 may generate one or more probability maps representing prediction probabilities of possible locations of one or more objects in an environment. For example, the prediction component 528 may generate one or more probability maps for vehicles, pedestrians, animals, and the like within a threshold distance from the vehicle 502. In some examples, the prediction component 528 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment.

The first prediction component 530 may include functionality to utilize data representing the environmental information (e.g., lane markings, crosswalks, locations of traffic lights, building locations, etc.) and the data representing the object information such as, for example, a velocity of an object in an environment, an acceleration of an object in an environment, a current state of an object in an environment, an object behavior class (e.g., aggressive, normal, etc.), a classification score (e.g., indicating whether or not an object will exit an area in a threshold amount of time), and the like.

Additionally, or alternatively, the first prediction component 530 (e.g., a more computationally-heavy model that utilizes data representing environmental information and data representing object information) may utilize more data than the second prediction component 532, and as a result, determine a more complex predicted trajectory of an object (e.g., a trajectory having one or more turns having a distance based on a velocity of the object). In some examples, the first prediction component 530 may be configured as the first prediction component 202 as described with respect to FIG. 2. Additionally, or alternatively, the first prediction component 530 may determine the predicted trajectory of an object by determining a predicted destination of the object within the area, and then determining the predicted trajectory by interpolating one or more points between the object and the predicted destination within the area. However, utilizing the first prediction component 530 to determine a predicted trajectory of an object by first determining a predicted destination of the object within the area may prove difficult for objects predicted to exit the area within the threshold period of time, and as such, a second prediction component 532 may be contemplated.

The second prediction component 532 may include functionality to utilize only data representing the object information and not the data representing the environmental information.

As such, the second prediction component 532 (e.g., a kinematics-based model that utilizes only data representing object information and not data representing environmental information) may utilize less data than the first prediction component 530, and as a result, determine a less complex predicted trajectory of the object (e.g., a straight trajectory having a distance based on a velocity of the object). In some examples, the second prediction component 532 may be configured as the second prediction component 204 as described with respect to FIG. 2.

The planning component 534 may determine a path for the vehicle 502 to follow to traverse through an environment. For example, the planning component 534 may determine various routes and paths and various levels of detail. In some examples, the planning component 534 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 534 may generate an instruction for guiding the autonomous vehicle along at least a portion of the route from the first location to the second location. In at least one example, the planning component 534 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 534 may alternatively, or additionally, use data from the perception component 522 and/or the prediction component 528 (including the first prediction component 530 and/or the second prediction component 532) to determine a path for the vehicle 502 to follow to traverse through an environment. For example, the planning component 534 may receive data from the perception component 522 and/or the prediction component 528 regarding objects associated with an environment. Using this data, the planning component 534 may determine a route to travel from a first location (e.g., a current location) to a second location (e.g., a target location) to avoid objects in an environment. In at least some examples, such a planning component 534 may determine there is no such collision free path and, in turn, provide a path which brings vehicle 502 to a safe stop avoiding all collisions and/or otherwise mitigating damage.

The memory 518 may further include one or more maps 536 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some examples, a map may include, but is not limited to: covariance data (e.g., represented in a multi-resolution voxel space), texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment, and may be loaded into working memory as needed, as discussed herein. In at least one example, the one or more maps 536 may include at least one map (e.g., images and/or a mesh). In some examples, the vehicle 502 may be controlled based at least in part on the map(s) 536. That is, the map(s) 536 may be used in connection with the localization component 520, the perception component 522 (and sub-components), the prediction component 528, and/or the planning component 534 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 may include one or more system controller(s) 538, which may be configured to control steering, propulsion, braking, safety, emitters, communication, and other systems of the vehicle 502. These system controller(s) 538 may communicate with and/or control corresponding systems of the drive system(s) 514 and/or other components of the vehicle 502, which may be configured to operate in accordance with a path provided from the planning component 534.

The vehicle 502 may connect to computing device(s) 542 via network 540 and may include one or more processor(s) 544 and memory 546 communicatively coupled with the one or more processor(s) 544. In at least one instance, the one or more processor(s) 544 may be similar to the processor(s) 516 and the memory 546 may be similar to the memory 518. In the illustrated example, the memory 546 of the computing device(s) 542 stores a remote operation component 548 and/or a model component 550. In at least one instance, the model component 550, after empirical testing and/or simulations, may generate ML models to be used by the perception component 522, as discussed herein. Though depicted as residing in the memory 546 for illustrative purposes, it is contemplated that the remote operation component 548 and the model component 550 may additionally, or alternatively, be accessible to the computing device(s) 542 (e.g., stored in a different component of computing device(s) 542 and/or be accessible to the computing device(s) 542 (e.g., stored remotely).

The model component 550 may include functionality to generate models for determining segmentation information, classification information, etc. for multi-channel image data, as discussed herein.

The processor(s) 516 of the computing device 504 and the processor(s) 544 of the computing device(s) 542 may be any suitable processor capable of executing instructions to process data and perform operations as described herein. By way of example and not limitation, the processor(s) 516 and 544 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 518 computing device 504 and the memory 546 of the computing device(s) 542 are examples of non-transitory computer-readable media. The memory 518 and 546 may store an operating system and one or more software applications, instructions, programs, and/or data to implement the methods described herein and the functions attributed to the various systems. In various implementations, the memory 518 and 546 may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, aspects of some or all of the components discussed herein may include any models, algorithms, and/or machine-learning algorithms. For example, in some examples, the components in the memory 518 and 546 may be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

Example Clauses

A. A system comprising: one or more processors; and one or more non-transitory computer-readable media storing instructions executable by one or more processors, wherein the instructions, when executed, cause the system to perform operations comprising: receiving sensor data from a sensor associated with a vehicle in an area of an environment; determining, based at least in part on the sensor data, an object in the area of the environment; determining, based at least in part on the sensor data, image data representing a top-down view of the area of the environment and the object in the area of the environment; inputting the image data into a machine learned (ML) model; receiving output data from the ML model, the output data including a classification score indicative of the object exiting the area within a threshold period of time; and determining, based at least in part on the classification score, a predicted trajectory of the object using a prediction component.

B. The system of paragraph A, the operations further comprising: determining, based at least in part on the classification score, that the object will remain in the area within the threshold period of time; and determining the predicted trajectory of the object using a primary prediction component.

C. The system of paragraph A or B, the operations further comprising: determining, based at least in part on the classification score, that the object will exit the area within the threshold period of time; and determining the predicted trajectory of the object using a secondary prediction component.

D. The system of paragraph C, the operations further comprising: determining additional image data representing the top-down view of the area of the environment, the additional image data including the object in the area; inputting the additional image data into the ML model; receiving additional output data from the ML model, the additional output data including an additional classification score indicative of the object exiting the area within the threshold period of time; determining, based at least in part on the additional classification score, that the object will remain in the area within the threshold period of time; and determining the predicted trajectory of the object using a primary prediction component, wherein the primary prediction component is different from the secondary prediction component.

E. The system of any one of paragraphs A-D, wherein the area is a bounded area, and a portion of the image data corresponding to the bounded area is used for planning a trajectory of the vehicle through the environment.

F. A method comprising, receiving sensor data from a sensor associated with a vehicle in an environment including an object; determining, based at least in part on the sensor data, scene data representing a view of an area of the environment, the object being included in the area; inputting the scene data into a model; receiving output data from the model, the output data including a classification score indicative of the object exiting the area within a threshold period of time; and determining, based at least in part on the classification score, a predicted trajectory of the object using a prediction component.

G. The method of paragraph F, wherein the area is a first area, and the method further comprising: determining, based at least in part on the classification score, that the object will remain in the first area within the threshold period of time; determining, based at least in part on the classification score, that the object will exit a second area within the threshold period of time, the first area including the second area, and a boundary of the second area being within a threshold distance of a boundary of the first area; and determining the predicted trajectory of the object using a secondary prediction component based at least in part on determining that the object will remain in the first area and exit the second area within the threshold period of time.

H. The method of paragraphs F or G, wherein the output data further indicates an additional classification score indicative of the object being in view of the sensor associated with the vehicle within the threshold period of time, and the method further comprising: determining, based at least in part on the additional classification score, the predicted trajectory of the object using the prediction component.

I. The method of any one of paragraphs F-H, further comprising: determining a confidence level associated with the classification score based at least in part on at least one of a position of the object relative to a boundary of the area; first contextual information associated with the object; second contextual information associated with the environment; or the threshold period of time; and determining, based at least in part on the confidence level associated with the classification score, the predicted trajectory of the object using the prediction component.

J. The method of any one of paragraphs F-I, further comprising: determining that the classification score satisfies a threshold score; determining, based at least in part on the classification score satisfying the threshold score, that the object will remain in the area within the threshold period of time; and determining the predicted trajectory of the object using a primary prediction component.

K. The method of any one of paragraphs F-J, further comprising: determining that the classification score satisfies a threshold score; determining, based at least in part on the classification score satisfying the threshold score, that the object will exit the area within the threshold period of time; and determining the predicted trajectory of the object using a secondary prediction component.

L. The method of any one of paragraphs F-K, further comprising: determining additional scene data representing the view of the area of the environment, the additional scene data including the object in the area; inputting the additional scene data into the ML model; receiving additional output data from the ML model, the additional output data including an additional classification score indicative of the object exiting the area within the threshold period of time; determining, based at least in part on the additional classification score, that the object will remain in the area within the threshold period of time; and determining the predicted trajectory of the object using a primary prediction component, wherein the primary prediction component is different from the secondary prediction component.

M. The method of any one of paragraphs F-L, wherein: determining the predicted trajectory of the object using the primary prediction component is based at least in part on first contextual information associated with the environment and second contextual information associated with the object; and determining the predicted trajectory of the object using the secondary prediction component is based at least in part on the second contextual information associated with the object.

N. One or more non-transitory computer-readable media storing instructions executable by a processors, wherein the instructions, when executed, cause the processor to perform operations comprising: receiving sensor data from a sensor associated with a vehicle in an environment including an object; determining, based at least in part on the sensor data, scene data representing a view of an area of the environment, the object being included in the area; inputting the scene data into a model; receiving output data from the model, the output data including a classification score indicative of the object exiting the area within a threshold period of time; and determining, based at least in part on the classification score, a predicted trajectory of the object using a prediction component.

O. The one or more non-transitory computer-readable media of paragraph N, wherein the area is a first area, and the operations further comprising: determining, based at least in part on the classification score, that the object will remain in the first area within the threshold period of time; determining, based at least in part on the classification score, that the object will exit a second area within the threshold period of time, the first area including the second area, and a boundary of the second area being within a threshold distance of a boundary of the first area; and determining the predicted trajectory of the object using a secondary prediction component based at least in part on determining that the object will remain in the first area and exit the second area within the threshold period of time.

P. The one or more non-transitory computer-readable media of paragraphs N or O, wherein the output data further indicates an additional classification score indicative of the object being in view of the sensor associated with the vehicle within the threshold period of time, and the operations further comprising: determining, based at least in part on the additional classification score, the predicted trajectory of the object using the prediction component.

Q. The one or more non-transitory computer-readable media of any one of paragraphs N-P, the operations further comprising: determining a confidence level associated with the classification score based at least in part on at least one of a position of the object relative to a boundary of the area; first contextual information associated with the object; second contextual information associated with the environment; or the threshold period of time; and determining, based at least in part on the confidence level associated with the classification score, the predicted trajectory of the object using the prediction component.

R. The one or more non-transitory computer-readable media of any one of paragraphs N-Q, the operations further comprising: determining that the classification score satisfies a threshold score; determining, based at least in part on the classification score satisfying the threshold score, that the object will remain in the area within the threshold period of time; and determining the predicted trajectory of the object using a primary prediction component.

S. The one or more non-transitory computer-readable media of any one of paragraphs N-R, the operations further comprising: determining that the classification score satisfies a threshold score; determining, based at least in part on the classification score satisfying the threshold score, that the object will exit the area within the threshold period of time; and determining the predicted trajectory of the object using a secondary prediction component.

T. The one or more non-transitory computer-readable media of any one of paragraphs N-S, wherein: determining the predicted trajectory of the object using a primary prediction component is based at least in part on first contextual information associated with the environment and second contextual information associated with the object; and determining the predicted trajectory of the object using a secondary prediction component is based at least in part on the second contextual information associated with the object, wherein the primary prediction component is different from the secondary prediction component.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by one or more processors, wherein the instructions, when executed, cause the system to perform operations comprising:
receiving sensor data from a sensor associated with a vehicle in an area of an environment;
determining, based at least in part on the sensor data, an object in the area of the environment;
determining, based at least in part on the sensor data, image data representing a top-down view of the area of the environment and the object in the area of the environment;
inputting the image data into a machine learned (ML) model;
receiving output data from the ML model, the output data including a classification score indicative of one of the object exiting the area within a threshold period of time or the object remaining in the area within the threshold period of time; and
determining, based at least in part on the classification score, a predicted trajectory of the object using one of a primary prediction component or a secondary prediction component.

2. The system of claim 1, wherein the classification score is configured as one of a binary number or a floating point number.

3. The system of claim 1, wherein the classification score is configured as a floating point number, and
further wherein a magnitude of the floating point number indicates a confidence level associated with the classification score.

4. The system of claim 1, the operations further comprising:
determining additional image data representing the top-down view of the area of the environment, the additional image data including the object in the area;
inputting the additional image data into the ML model;
receiving additional output data from the ML model, the additional output data including an additional classification score indicative of the object exiting the area within the threshold period of time;
determining, based at least in part on the additional classification score, that the object will remain in the area within the threshold period of time; and
determining the predicted trajectory of the object using a primary prediction component, wherein the primary prediction component is different from the secondary prediction component.

5. The system of claim 1, wherein the area is a bounded area, and a portion of the image data corresponding to the bounded area is used for planning a trajectory of the vehicle through the environment.

6. A method comprising:
receiving sensor data from a sensor associated with a vehicle in an environment including an object;
determining, based at least in part on the sensor data, scene data representing a view of an area of the environment, the object being included in the area;
inputting the scene data into a machine learned (ML) model;
receiving output data from the ML model, the output data including a classification score indicative of one of the object exiting the area within a threshold period of time or remaining in the area within the threshold period of time; and
determining, based at least in part on the classification score, a predicted trajectory of the object using one of a primary prediction component or a secondary prediction component.

7. The method of claim 6, wherein the area is a first area, and the method further comprising:
determining, based at least in part on the classification score, that the object will remain in the first area within the threshold period of time;
determining, based at least in part on the classification score, that the object will exit a second area within the threshold period of time, the first area including the second area, and a boundary of the second area being within a threshold distance of a boundary of the first area; and
determining the predicted trajectory of the object using a secondary prediction component based at least in part on determining that the object will remain in the first area and exit the second area within the threshold period of time.

8. The method of claim 6, wherein the output data further indicates an additional classification score indicative of the object being in view of the sensor associated with the vehicle within the threshold period of time, and the method further comprising:
determining, based at least in part on the additional classification score, the predicted trajectory of the object using the primary prediction component or the secondary prediction component.

9. The method of claim 6, further comprising:
determining a confidence level associated with the classification score based at least in part on at least one of:
a position of the object relative to a boundary of the area;
first contextual information associated with the object;
second contextual information associated with the environment; or
the threshold period of time; and
determining, based at least in part on the confidence level associated with the classification score, the predicted trajectory of the object using the primary prediction component or the secondary prediction component.

10. The method of claim 6, further comprising:
determining that the classification score satisfies a threshold score;

determining, based at least in part on the classification score satisfying the threshold score, that the object will remain in the area within the threshold period of time; and determining the predicted trajectory of the object using a primary prediction component.

11. The method of claim 6, further comprising:

determining that the classification score satisfies a threshold score;

determining, based at least in part on the classification score satisfying the threshold score, that the object will exit the area within the threshold period of time; and determining the predicted trajectory of the object using a secondary prediction component.

12. The method of claim 11, further comprising:

determining additional scene data representing the view of the area of the environment, the additional scene data including the object in the area;

inputting the additional scene data into the ML model;

receiving additional output data from the ML model, the additional output data including an additional classification score indicative of the object exiting the area within the threshold period of time;

determining, based at least in part on the additional classification score, that the object will remain in the area within the threshold period of time; and determining the predicted trajectory of the object using a primary prediction component, wherein the primary prediction component is different from the secondary prediction component.

13. The method of claim 12, wherein:

determining the predicted trajectory of the object using the primary prediction component is based at least in part on first contextual information associated with the environment and second contextual information associated with the object; and determining the predicted trajectory of the object using the secondary prediction component is based at least in part on the second contextual information associated with the object.

14. One or more non-transitory computer-readable media storing instructions executable by a processor, wherein the instructions, when executed, cause the processor to perform operations comprising:

receiving sensor data from a sensor associated with a vehicle in an environment including an object;

determining, based at least in part on the sensor data, scene data representing a view of an area of the environment, the object being included in the area;

inputting the scene data into a machine learned (ML) model;

receiving output data from the ML model, the output data including a classification score indicative of one of the object exiting the area within a threshold period of time or remaining in the area within the threshold period of time; and determining, based at least in part on the classification score, a predicted trajectory of the object using one of a primary prediction component or a secondary prediction component.

15. The one or more non-transitory computer-readable media of claim 14, wherein the area is a first area, and the operations further comprising:

determining, based at least in part on the classification score, that the object will remain in the first area within the threshold period of time;

determining, based at least in part on the classification score, that the object will exit a second area within the threshold period of time, the first area including the second area, and a boundary of the second area being within a threshold distance of a boundary of the first area; and determining the predicted trajectory of the object using a secondary prediction component based at least in part on determining that the object will remain in the first area and exit the second area within the threshold period of time.

16. The one or more non-transitory computer-readable media of claim 14, wherein the output data further indicates an additional classification score indicative of the object being in view of the sensor associated with the vehicle within the threshold period of time, and the operations further comprising:

determining, based at least in part on the additional classification score, the predicted trajectory of the object using the primary prediction component or the secondary prediction component.

17. The one or more non-transitory computer-readable media of claim 14, the operations further comprising:

determining a confidence level associated with the classification score based at least in part on at least one of:
    a position of the object relative to a boundary of the area;
    first contextual information associated with the object;
    second contextual information associated with the environment; or
    the threshold period of time; and determining, based at least in part on the confidence level associated with the classification score, the predicted trajectory of the object using the primary prediction component or the secondary prediction component.

18. The one or more non-transitory computer-readable media of claim 14, the operations further comprising:

determining that the classification score satisfies a threshold score;

determining, based at least in part on the classification score satisfying the threshold score, that the object will remain in the area within the threshold period of time; and determining the predicted trajectory of the object using a primary prediction component.

19. The one or more non-transitory computer-readable media of claim 14, the operations further comprising:

determining that the classification score satisfies a threshold score;

determining, based at least in part on the classification score satisfying the threshold score, that the object will exit the area within the threshold period of time; and determining the predicted trajectory of the object using a secondary prediction component.

20. The one or more non-transitory computer-readable media of claim 14, wherein:

determining the predicted trajectory of the object using a primary prediction component is based at least in part on first contextual information associated with the environment and second contextual information associated with the object; and determining the predicted trajectory of the object using a secondary prediction component is based at least in part on the second contextual information associated with the object, wherein the primary prediction component is different from the secondary prediction component.

* * * * *